(12) United States Patent
Tobin

(10) Patent No.: US 11,431,171 B2
(45) Date of Patent: Aug. 30, 2022

(54) BLOCKCHAIN DISTRIBUTION ENERGY MANAGEMENT WITH OPTIMIZED BALANCING

(71) Applicant: Omega Grid, LLC, Chicago, IL (US)

(72) Inventor: Killian Ross Tobin, Chicago, IL (US)

(73) Assignee: Omega Grid, LLC, Chicago, IL (US)

( * ) Notice: Subject to any disclaimer, the term of this patent is extended or adjusted under 35 U.S.C. 154(b) by 367 days.

(21) Appl. No.: 16/758,040

(22) PCT Filed: Oct. 25, 2018

(86) PCT No.: PCT/US2018/057501
§ 371 (c)(1),
(2) Date: Apr. 21, 2020

(87) PCT Pub. No.: WO2019/084262
PCT Pub. Date: May 2, 2019

(65) Prior Publication Data
US 2021/0194245 A1    Jun. 24, 2021

Related U.S. Application Data

(60) Provisional application No. 62/576,788, filed on Oct. 25, 2017.

(51) Int. Cl.
*G06Q 50/06*    (2012.01)
*G06Q 20/14*    (2012.01)
(Continued)

(52) U.S. Cl.
CPC .......... *H02J 3/008* (2013.01); *G06Q 30/0206* (2013.01); *H02J 3/003* (2020.01); *H02J 3/0075* (2020.01); *H04L 9/0643* (2013.01)

(58) Field of Classification Search
CPC .......... H02J 3/008; H02J 3/003; H02J 3/0075; G06Q 30/0206; H04L 9/0643; Y04S 50/14; Y04S 50/16; G06F 1/26
See application file for complete search history.

(56) References Cited

U.S. PATENT DOCUMENTS

2003/0041002 A1    2/2003  Hao et al.
2004/0010478 A1    1/2004  Peljto et al.
(Continued)

OTHER PUBLICATIONS

International Search Report, International Application No. PCT/US2018/57501 dated Jan. 11, 2019, 3 pages.
(Continued)

*Primary Examiner* — Rexford N Barnie
*Assistant Examiner* — Thai H Tran
(74) *Attorney, Agent, or Firm* — Creativenture Law, LLC; Dennis J M Donahue, III; Kevin Staed

(57) ABSTRACT

A cyber-secure local electrical power market for a power grid with a utility operator transmitting power where a group of participating nodes within the distribution network operate together through respective computers on a blockchain architecture. The participating nodes have controllable resources with controllers in operative communication within the blockchain architecture, such as controllable generators and controllable loads. Decentralized market software operates on computers within the blockchain architecture and shares blockchain datasets that include financial information associated with the controllable resources and operating states of the grid. One or more of the computers in the blockchain architecture calculates Locational Marginal Pricing (LMP) across the participating nodes according to the set of financial information and determines a set of energy service orders corresponding to LMP for the controllable resources to change their operating states. The computers also preferably calculate an energy balance with the transmission system in determining the energy service orders.

17 Claims, 5 Drawing Sheets

(51) Int. Cl.
*H02J 3/00* (2006.01)
*G06Q 30/02* (2012.01)
*H04L 9/06* (2006.01)

(56) References Cited

U.S. PATENT DOCUMENTS

| | | |
|---|---|---|
| 2009/0319415 A1 | 12/2009 | Stoilov et al. |
| 2013/0254090 A1 | 9/2013 | Chassin et al. |
| 2013/0325691 A1 | 12/2013 | Chassin et al. |
| 2017/0083989 A1 | 3/2017 | Brockman et al. |
| 2017/0103468 A1* | 4/2017 | Orsini .................... G06Q 30/06 |
| 2017/0264493 A1 | 9/2017 | Cencini et al. |
| 2017/0285720 A1* | 10/2017 | Shah ..................... G06F 1/3206 |
| 2017/0358041 A1* | 12/2017 | Forbes, Jr. ............. G06Q 20/02 |

OTHER PUBLICATIONS

International Preliminary Report on Patentability, International Application No. PCT/US2018/57501, dated Feb. 4, 2020, 26 pages.

* cited by examiner

BLOCKCHAIN DISTRIBUTION ENERGY MANAGEMENT WITH OPTIMIZED BALANCING

CROSS-REFERENCE TO RELATED APPLICATIONS

This application claims priority from international PCT Application Ser. No. PCT/US18/57501 filed on Oct. 25, 2018 which claims priority from U.S. Provisional Patent Application No. 62/576,788 filed on Oct. 25, 2017, both of which are hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to managing energy in a distribution network of macro-energy producers, micro-energy producers, and consumers, and more particularly to a decentralized distribution energy management system with grid balancing that is preferably implemented with a blockchain architecture

Related Art

Distribution energy management systems have traditionally relied on a network of macro-energy producers that manage the supply and demand for electrical power using centralized control systems with an optimal power flow analysis. In traditional power grids, the micro-energy producers had been insignificant so that they could be evaluated with the centralized control system even though they were not actively managed by the centralized control system. As micro-energy producers become more prevalent, particularly micro-energy producers that use renewable energy sources to generate electricity, such as solar power, wind power, and hydro power, and may have distributed energy storage capacities that had not previously been possible, such as with advances in battery technology, there have been proposals and proof of concept tests for a different electric power industry business models that create value using transactive energy (TE) models, including economic and control mechanisms that allow for the dynamic balance of supply and demand across the entire electrical infrastructure using value as a key operational parameter.

Many current transactive energy models remain fixed on the centralized control system methodology of traditional energy management systems. However, the decrease in prices for batteries and for renewable energy producers such as solar, wind, and other non-dispatchable generators, is helping make clean energy more affordable. It is also making the grid exponentially more complex for utilities to manage. Some decentralized transactive energy models have been proposed, but they lack the robust solution of the centralized control and can result in overloads and/or underloads in some situations. Accordingly, there is a need for a robust technical solution to a decentralized control system which will maintain an optimal power flow across the grid when evaluating both the macro-energy producers as was as the micro-energy producers and the consumers throughout the grid.

Additionally, current transactive energy models still place an inordinate amount of the revenue risk on the utilities that serve as the macro-energy producers and that are required by law to provide sufficient online energy capacity to satisfy the load needed by consumers on the grid without accounting for the growing micro-energy producers that can supplement the capacity to satisfy the needed load. Accordingly, in addition to the robust technical solution, there is a need for a new energy business model that works with the legal requirements placed on utilities while also reducing the revenue risk of distributed generation for the utilities. A preferred solution would encourage investment in micro-energy production by property owners apart from the utilities and would ultimately result in lower rates for the consumers.

The software systems from the transmission grid are not suitable for the dynamic distribution grid. The transmission grid underwent a shift from the vertically integrated model into a market model about thirty (30) years ago in the United States. The custom market software deployed at that time is still largely operational today. There are attempts to migrate these technology platforms for use at the distribution level. These financial market systems have aspects of redundancy built in, yet still suffer from a choke point or single point of failure with regards to their grid balancing and market settlement systems. It would be preferred to provide a decentralized ledger solution that has redundancies and is not subject to a single point of failure and that is also scalable so that millions of small generation sources can be supported.

The preferred solution accounts for local micro-energy producers in a distribution level electricity market that properly prices the location of generation and consumption. This market empowers the local utility to allow for maximum customer choice while guaranteeing reimbursement of their infrastructure investments. Additionally, with a decentralized ledger of the financial information for the energy resources at the local level, regulators have the information that they need to audit the market data and the system can be developed in such a way to prevent the undo exercise of market power.

SUMMARY OF THE INVENTION

According to the present disclosure, there are several aspects of the present invention. Generally, the invention is a cyber-secure local electrical power market for a power grid with a utility operator transmitting power where a group of participating nodes within the distribution network operate together through respective computers on a blockchain architecture. According to a basic aspect of the present invention, the participating nodes have controllable resources with controllers in operative communication within the blockchain architecture, such as controllable generators and controllable loads. Decentralized market software operates on computers within the blockchain architecture and shares blockchain datasets that include financial information associated with the controllable resources and operating states of the grid. One or more of the computers in the blockchain architecture calculates Locational Marginal Pricing (LMP) across the participating nodes according to the set of financial information and determines a set of energy service orders corresponding to LMP for the controllable resources to change their operating states. The computers also preferably calculate an energy balance with the transmission system in determining the energy service orders.

In another aspect of the present invention, the set of computers operating within the blockchain architecture calculate an energy balance with a transmission system in determining the energy service orders, and the Locational Marginal Pricing is performed by solving the Security Constrained Economic Dispatch optimization problem for the local distribution of the electrical power on the power grid according to the set of financial information and grid constraints.

In yet another aspect of the invention, the power generation bids define a set of ranges in which the participating controllable generators offer to operate, and the power load bids define a set of variable load demands consumers offer to operate with their participating controllable loads. The set of energy service orders activates a corresponding set of controllers for the controllable resources to change their respective states from an initial state to a new controlled state, and the blockchain architecture is updated with a new blockchain dataset corresponding with the new controlled state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

DETAILED DESCRIPTION OF THE PREFERRED EMBODIMENTS

The following description of the preferred embodiment(s) is merely exemplary in nature and is in no way intended to limit the invention, its application, or uses.

Figure 1:
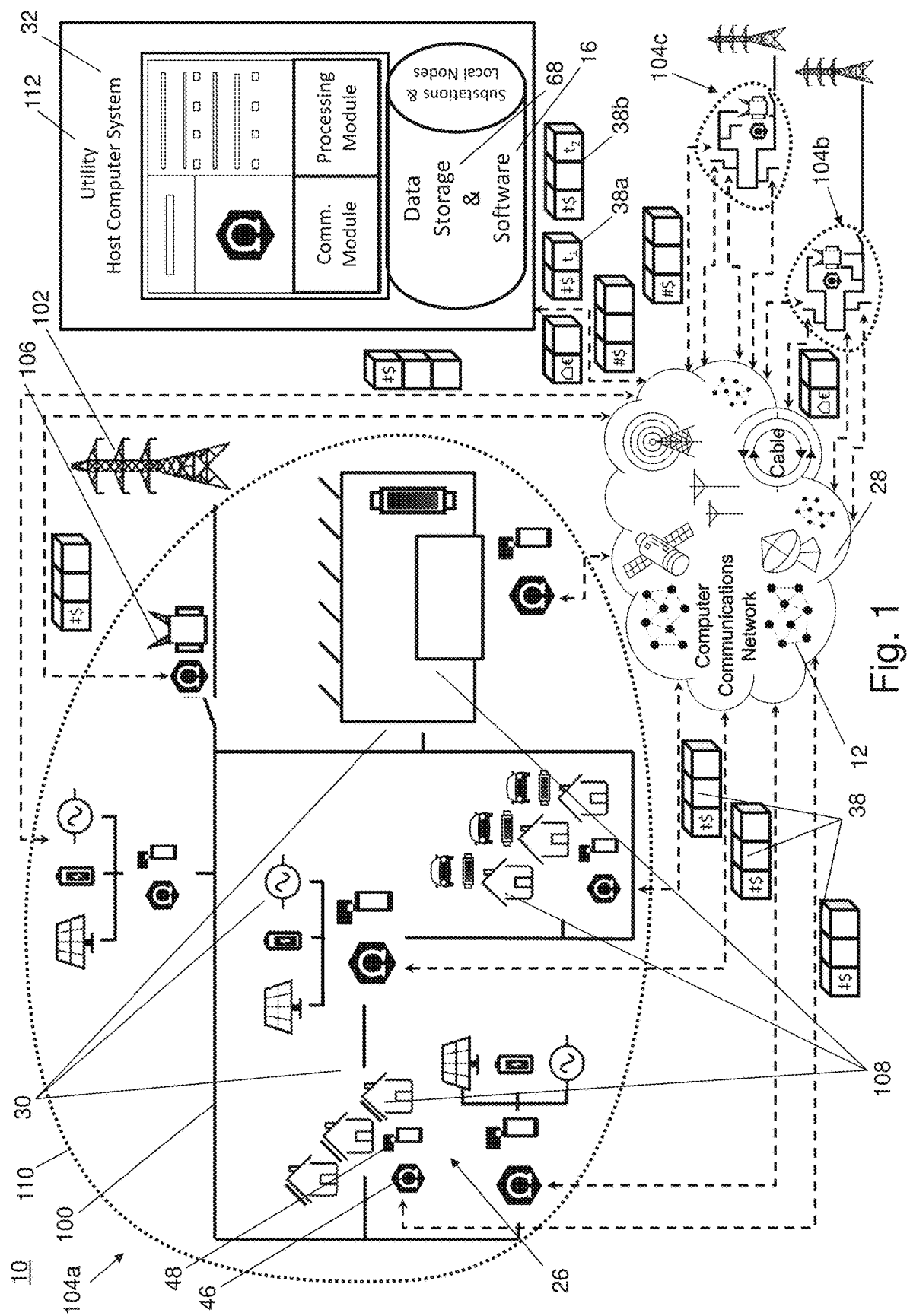
FIG. 1 is a schematic diagram of the blockchain distribution energy management system according to the present invention.

The present invention, known as the Omega Grid (OG) system, is a decentralized software system that includes technology controls and business management elements which work together to provide a robust solution for a transactive energy models that work together to prevent overloads and/or under-loads and which also use economic market forces to allow for the efficient production and distribution of electrical power along grid infrastructure that already exists. The present invention provides a technical and economic solution that avoids significant investments by the utilities that will continue to serve as the macro-energy producers and that allows for small, distributed investments by micro-energy producers, and that maintains the optimal power flow as an underpinning element to the entire balance of the distribution of the energy from the energy producers to satisfy the load on the grid by the energy consumers. A schematic diagram of the inventive system is shown in FIG. 1 and is generally described below.

Generally, the Omega Grid blockchain distribution energy management system offers a local energy market for electric utilities to balance the grid and manage supply and demand in real time. Local prices are lowered to encourage consumption and discourage excess generation in the case of oversupply, and local prices rise to encourage more generation and less consumption in the case of undersupply. The Omega Grid system creates cyber-secure local markets using Locational Marginal Pricing (LMP) to account for local grid constraints with the financial data for local controllable resources secured and shared on a blockchain architecture. The cyber-secure local markets of the present system encourage local consumption and generation which can participate in spot markets and/or forward markets. The creation of a cyber-secure local markets also allows for an improved peer-to-peer marketplace that provides for safety of the system and had not been possible with previously known peer-to-peer energy trading platforms.

The LMPs calculated by the processors in the blockchain distribution energy management system work with controllable resources, such as controllable generators 30a, controllable battery packs 30b which may include electric vehicles (EV), and controllable loads 30c, to provide bids that represent their startup and marginal economics (costs) for producing or consuming electricity. LMPs are calculated to match load and available generation in a least cost manner so the system can deliver power to every load on the system without any grid constraints being violated. The LMP calculation process is an outcome of solving the Security Constrained Economic Dispatch (SCED) optimization problem. SCED is generally understood to be the operation of generation facilities to produce energy at the lowest cost to reliably serve consumers, recognizing any operational limits of generation and transmission facilities. The system of the present invention expands this problem from the transmission system to include local generation and load on the distribution system. It is generally considered too complicated to evaluate the SCED optimization problem for the distribution system because of the increased complexity of the problem. However, by limiting the participating nodes 108 to those nodes which have controllable resources and are served by the same substation 106 (or a limited number of substations), the present invention solves the SCED optimization problem for the distribution system.

Figure 2:
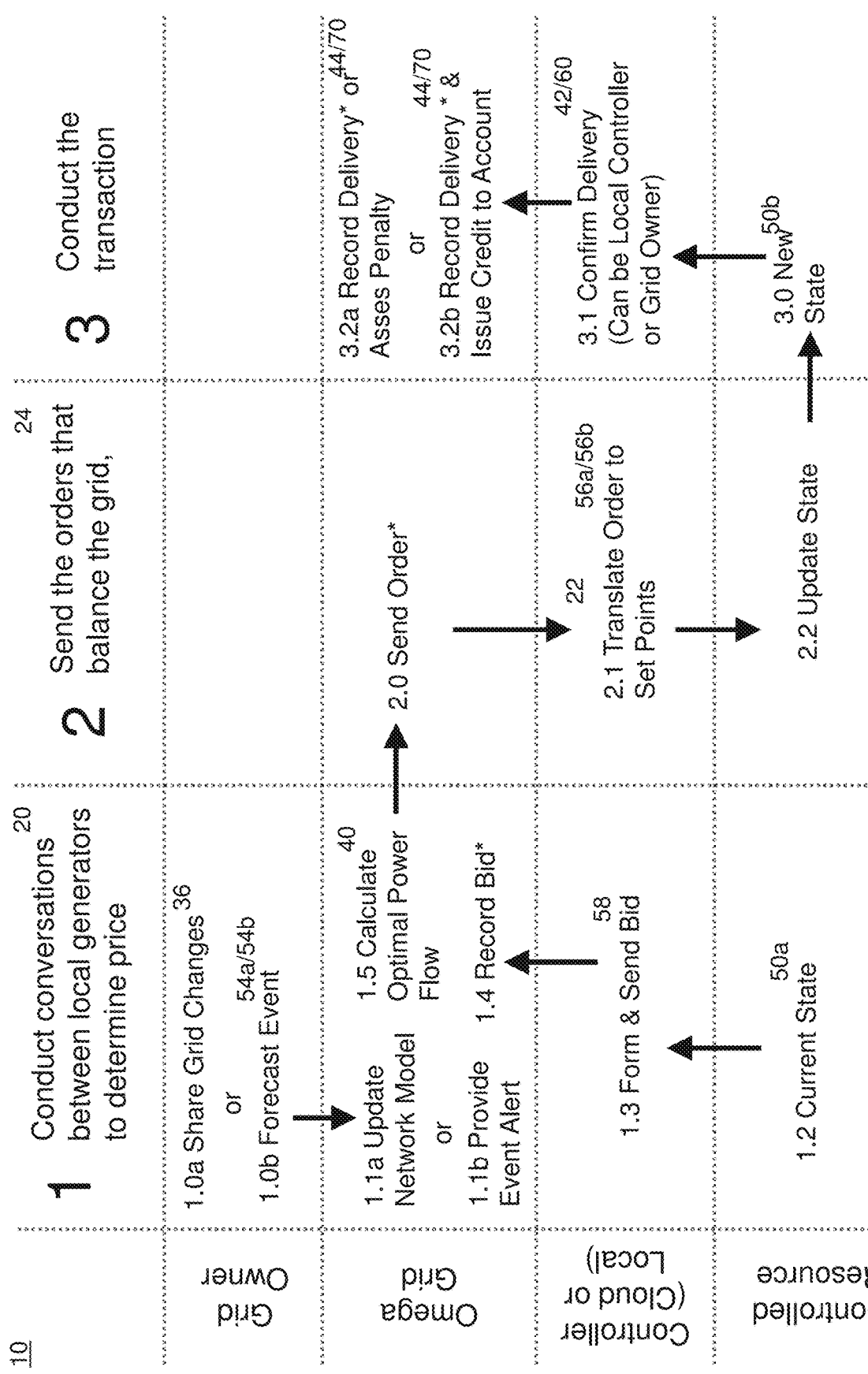
FIG. 2 is a flowchart of the general steps for the blockchain distribution energy management system shown in FIG. 1.

In the present blockchain distribution energy management system, each bid 58 consists of a min power, max power, and a description of the cost/Watt relationship for the timeframe they are bidding into. These bids are compared with the loads on the network and the ability of the system to deliver electricity to these loads without violating grid constraints. Bids can also be submitted by controllable loads, they would generally be designed to offer to use more energy when electricity is inexpensive and less when it is expensive. The steps of the process according to the present invention are shown in FIG. 2 for transmission market data during which real-time grid changes are used and alternatively for forecasted forward market data in which the status of the grid and events are forecasted. Forecasts are usually one or more hours in advance or a day in advance.

The electric grid is designed to maintain a consistent voltage and the wires that carry electricity are designed to safely deliver a maximum load. Voltage drops below or increases above a threshold can damage equipment and are considered a voltage constraint. Overloaded wires within a factor of their engineering capacity would be considered a thermal constraint.

The distribution energy management system's spot market determines the value of electricity over time at critical points on the distribution grid. Prices are adjusted to take into account grid voltage and thermal constraints. The local market is useful for the utility to fund the maintenance and security of grid infrastructure. The local market allows generators to operate as merchants who sell their flexibilities directly back to the utility if they do not have peer-to-peer contracts in place. The local market encourages property owners to invest in suitable energy resources or building improvements which can include energy efficiency or controllable loads. Generators and consumers mitigate the risk of being exposed to variable spot market pricing by entering into peer-to-peer (or bilateral) agreements with other market participants.

Although a centralized database architecture is possible for the sharing of financial information 14 and calculation of the LMPs 22, the preferred embodiment of the present invention is implemented with a blockchain architecture to manage local markets. The blockchain is preferably a private decentralized ledger technology which offers increased security as more market participants join, redundancy of transactions across the participants, immediate sharing of market state, reducing need for a central financial index, and the potential for near real time transactions settlement with low transaction fees. It is also possible for the computer processors within the blockchain architecture to share the processing of the computational work, such as the calculations of the optimal power flow and the LMPs as well as the polling of controllable resources to determine a set of the controllable resources 30 that can serve as participating generators based on their operating electrical power loads according to a set of power generation bids and also determine a set of load demands by consumers with controllable loads having the electrical power meters and the corresponding computers according to a set of power load bids. Accordingly, the present invention avoids a single point of failure situation because the decentralized blockchain architecture can perform calculations and conduct transactions independent of a central authority. As explained below, for enhanced safety and security, the initial setup requires the controllable nodes to be registered with the utility or other authority that is responsible for maintaining power on the local grid.

In an example implementation, the cyber-secure local market 10 software runs on microgrid controllers. The optimal power flow calculation for 3,000 nodes runs in under 3 minutes, enabling a five (5) minute market clearing below most substation networks. A 5-minute market is preferred because it encourages the heating and cooling (HVAC) systems of buildings to respond to grid needs. HVAC loads represent a significant contributor to grid demand and longer market cycles do not value HVAC contributions. The network communication speed between nodes is the constraint for the number of market participants below each substation. It will be appreciated that as computing speeds and communication speeds increase, the computation of a distribution system with additional nodes would be possible within the 5-minute window. The schematic view of the inventive system in FIG. 1 shows the scalability of the present invention with three (3) communities 104a, 104b and 104c serviced by different substation facilities 106 in the distribution system of a utility 102. The utility's host computer system 112 forms a part of the blockchain architecture 12 along with the computers for the controllable resources in each one of these communities, and the computers for each one of these communities would share their own blockchain dataset 38 to manage the financial information for each one of the participating nodes 114 within the respective communities.

Each node within the power distribution system is responsible for some component on the electrical grid (load, generators, switch, transformer, bus, lines). However, the nodes within the computer communication network are not the same as the electrical grid network. Accordingly, the computer communication network (or logical network) which may be implemented with the blockchain architecture is shown with dotted lines for the communication channels 110 in FIG. 1 and is distinguished from the electrical network (or in short: the grid) which are shown with solid lines 100 in FIG. 1.

It will be appreciated that the blockchain architecture allows the system to be scalable as a services oriented platform that communicates energy service orders 24 during a particular period of time. The blockchain software can be deployed directly on utility smart meters 46 with their own computer processors to negotiate the bids and orders with behind-the-meter controllers 48 for the controllable resources. In the case of real power, this represents an order for a unit of energy (W) delivered over a particular time horizon. This core approach can be abstracted to represent orders spanning multiple time-horizons and the distribution systems of different communities, each having their own substation facility, and expanded/adapted to settle other energy services markets such as reactive or reserve power. As explained below with reference to FIGS. 3A and 3B, a representative local power market is shown in an initial state 10a and a subsequent controlled state 10b, respectively. The initial blockchain dataset 38a begins with the financial information associated with the initial state 50a and is updated according to the financial information associated with the subsequent controlled state. As conditions in the distribution system change 50b, the blockchain dataset changes 38b, and the market software platform 16 recalculates the LMP and corresponding energy service orders 20 thereby activating the controllable resources to change their respective states of operation. The software can operate solely in the processor of the utility host computer system but is preferably run using distributed processing operations on the computers within the blockchain architecture.

The cyber-secure local markets of the blockchain distribution energy management system can be used as a financial basis for a customer facing peer-to-peer (P2P) marketplace that allows consumers and generators to sell energy to each other and engage in risk sharing agreements. The P2P marketplace creates standard terms between the buyers (consumers) and sellers (generators) on the grid. The financial agreement most commonly offered is a contract-for-difference (Cm) where two parties agree on a set price for energy deliver and one party compensates the other for the difference in the cost for energy from the utility determined in the Cyber Secure Local Market.

Blockchain technology is also useful for managing agreements in a P2P marketplace because public, trustless, blockchain networks are already known to enable P2P payments without the need for a central intermediary. Blockchain networks have also evolved to incorporate smart contracts, such as in networks like Ethereum or Stellar. Smart contracts typically move funds, digital assets, or cryptocurrency tokens as instructed by a programming language. Due to the sensitivity of the power grid infrastructure, the present invention preferably uses a private blockchain architecture with resource nodes that are vetted by the utility that manages the grid. The utility's gatekeeping role for the addition of resource nodes that are to the blockchain architecture is described below with reference to the process for initial authentication of resource nodes and other customer nodes.

In the blockchain distribution energy management system of the present invention, the P2P marketplace is preferably provided as a reference application in which the P2P application code is released to the community under an appropriate open source license. Developers can be rewarded for localizing the application with respect to their regulations, the needs of the local grid, commercial terms, and payment gateways while the blockchain distribution energy management system incorporates the ability to deploy smart contracts that settle against the cyber-secure local market as generally described above. In addition to traditional payment gateways, the blockchain distribution energy management system and open source developers can enable alternative cryptocurrency settlements into the P2P reference application.

The technical solution uses a decentralized architecture with controls built into the system that is NERC-CIP compliant. In particular, as explained in detail below, the present system includes the sharing of power production and load demand information between the energy producers, micro and macro, so that an optimal power flow analysis can be performed at each node of the system and that can be aligned with the requirements placed on the macro-energy producers as regulated utilities. Since the present system is decentralized, it is also more robust than traditional centralized energy management systems because there is redundancy in the system across the nodes in the network which actually increases the security of the overall system. In the preferred embodiment, the energy and market information shared between the nodes uses a private blockchain structure to further enhance the security of the system.

Generally, the blockchain distribution energy management system operates a decentralized market software platform for electrical power on a power grid; the system uses Locational Marginal Pricing (LMP) and an optimal power analysis 40. The system's software runs on a network of computers 26 that are in operative communication with electrical power meters and in networked communication with a host computer system 32 over a communications network. The software is also running on the host computer system that is provided by and associated with a utility-owned infrastructure. The primary steps of the blockchain distribution energy management system are listed below and are generally shown in FIG. 2.

Load the most recent topology 36 of the electrical grid into a database 68 in the host computer system.

Using a processor in the host computer system, preferably with the blockchain architecture, poll each one of the computers communicating with the corresponding electrical power meters for a real-time electrical power load status;

With the processor and the preferable blockchain architecture, poll a plurality of controllable resources, such as generators, batteries, and loads, and a corresponding set of operating electrical power loads.

Again with the processor and the preferable blockchain architecture, determine a set of the controllable resources that can serve as participating generators based on their operating electrical power loads according to a set of power generation bids and also determine a set of load demands by consumers with controllable loads having the electrical power meters and the corresponding computers according to a set of power load bids.

Use the processor to conduct an optimal power flow analysis to determine a set of energy service orders to be placed with the participating controllable resources, such as electrical power orders 56a to be placed with the participating controllable generators and batteries and electrical power constraints 56b (limits or reductions) to be placed with the participating controllable loads.

Using a communications module in the host computer system in operative communication with the processor through networked communication, preferably with the blockchain architecture, communicating the energy services orders to the participating nodes.

With the processor and the preferable blockchain architecture, calculate a Locational Marginal Pricing (LMP) 22 for the energy service orders, Use the processor and the preferable blockchain architecture to confirm 42 with each of the participating nodes controllable generators and the consumers with the controllable loads a set of implementations 60 of the respective energy service orders by the corresponding participating controllable generators and controllable loads, Initiate 44 in the processor and the preferable blockchain architecture a settlement process 70 with each one of the participating generators based on electric power deliveries to the power grid by the corresponding participating controllable generators and electric power constraints and reductions on the power grid by the corresponding participating controllable loads. In those cases where a controllable generator or controllable load fails to meet its commitment, the settlement process can include assessing a penalty.

As explained above, the cyber-secure local market software can operate using real-time transmission market data 54a during or forecasted forward market data 54b. In an example forecasting implementation of the inventive system, selected customer nodes 108 (residential, commercial, and industrial) are provided with an alert of an anticipated peak event. Customers are then given the option to respond with a bid indicating the amount of power and price they are willing to accept to generate or not consume for each hour during the demand peak event. These customer bids can be representative of their cost curve (i.e., equations modeling customer costs) for load reduction or generation and can vary on a periodic basis, such as hourly. The cyber-secure local market software confirms the bids with an order. These orders are confirmed based on meter data and/or local controller's running the software. For complex generator or battery control, distributed controllers can be deployed at the customer site with the software installed. The software settles bids and records the completed transactions. This market bidding system is built on a private blockchain architecture including the customer-sited computer hardware and utility host computer system, and all of the financial information, i.e., the bids, the orders, and the completed transactions, are preferably added to the blockchain dataset. Additionally, credits for the completed transactions can be recorded on the blockchain dataset. The blockchain dataset record along is auditable and visible by the market participants.

Additionally, according to a preferred embodiment, the processor and the preferable blockchain architecture determines a set of the variable power producers that can provide additional power generation depending on their power generation status. As an example, variable power producers can include renewable energy power producers that may be cyclical or could otherwise be dependent on natural forces, such as solar panels, wind turbines, hydroelectric turbines, tidal generators, geothermal heat exchangers, and other non-dispatchable generators 34. Additionally, in the preferred embodiment, the power generation bids define the range in which the participating controllable generators are willing to operate and the power load bids define the variable load demands in which participating consumers with controllable loads are willing to operate, and the communicated electrical power orders confirms the values for the power generation bids and issues the order of the power to the consumers.

The table below lists the differences between the attributes of other power transactive energy systems and the decentralized Omega Grid system of the present invention that uses the Locational Marginal Pricing (LMP) and an optimal power analysis. Following the table, the benefits of the Omega Grid blockchain distribution energy management system are explained.

| Attributes | TeMix: Two-way Subscription Tariff | Distribution Marginal Price (DMP) | Omega Grid (OG-LMP) |
|---|---|---|---|
| Capture Forward Deferral & Other Benefits in Planning | Investment and investment timing of all parties using forward planning by parties is coordinated using forward transactions and subscriptions | Incremental cost bogy used with competitive procurement to define infra-marginal cost for bilateral contracts | Generation and Consumption bids inform DO on grid upgrades that would encourage more transactions on the grid. |
| Distribution Operation | Distribution Operator (DO) | Distribution Operator (DO) initially Distribution System Operator (DSO) later | Distribution Operator |
| Coupling Between Short-term Market & Dispatch | Self-dispatch by retail end customers and distributed generation and storage | Bid-In DO and ISO dispatch a customer response to augmented retail tariffs | DO defines spot market dispatch based on Optimal Power Flow. |
| Retail Energy Market Operation | Two-way Subscription Tariffs and forward bilateral transactions coordinated w/ISO LMP markets for balancing. | Forward Bi-lateral market + ISO LMP settlement on residuals | Forward bilateral transactions settled as contracts for difference at pre-determined node. |
| Distribution Transport Service | Two-Way Subscription Tariffs and spot pricing by DO | Distribution Access Charge (2-part tariff) by DO | Generator is charged a transaction fee on energy provided to grid by DO |
| Retail Energy Market | Competitive or franchise retail and municipal models | Retail access model (as currently exists is several states) | Retail choice and opportunity for buyer to directly contract with generator |
| Secondary Retail Products | Energy transactions on short duration intervals for frequency regulation and reserves, capacity like energy options, and Reactive Power | Reliability, Voltage/VAR & Power Quality | Reliability, Voltage/VAR & Power Quality |
| Distribution Grid & Other Retail Services | Reliability, Resilience, & Power Quality | Reliability, Resilience, & Power Quality | Reliability, Resilience, & Power Quality |

With regard to the capture forward deferral attribute of the present invention, it is an improvement over the prior art systems because the DO receives data on asset availability that will inform them on bids that are not called on and would direct the DO on grid upgrades that will create additional revenue. With regard to the coupling between the short term market and dispatch, even though self-dispatch is easiest method to use when viewed from the customer standpoint, self-dispatch does not protect the grid from overloads in a localized zone and can result in dangerous imbalances in the loads between different nodes. In operation, the OG system's DO defines spot market dispatch based on the optimal power flow analysis.

In the present invention, the settlement of forward bilateral transactions as contracts for difference at pre-determined node are an improvement over the alternative retail energy market operations because it protects the power grid from overloading and/or under—loading and requires less coordination between parties and the ISO. Further, according to the operation of the present invention, the generator is charged a transaction fee on energy provided to grid by DO which allows for existing rate structures to be accommodated during the transition to full markets. It will be appreciated that grid fees can also be fully or partially assessed on the consumer. In the retail energy market, the present invention allows for retail choice and the opportunity for buyers to directly contract with the generators which provides for coexistence of peer to peer procurement as well as traditional retail procurement.

In the preferred embodiment, a proprietary, private blockchain is used to record the orders, commitments, confirmed delivery and final settlement details of each participating node. The blockchain is preferably developed in the Python programming language although other software languages are also possible. The blockchain is capable of running on Linux-based end-points. It will be appreciated that various development kits and hardware options are available, such as Raspberry Pi® hardware. Public blockchains and cloud-based services are alternative delivery models.

Using the blockchain distribution energy management system, utilities can incorporate micro-energy producers into their existing grid infrastructure as multiple nodes to form a composite grid with macro-energy production and micro-energy production with minimal expense to the utilities and distributing the cost over the micro-energy producers who want to join the composite grid. The micro-energy producers integrate the system into the computer control systems which work with their existing meters. The utility on the composite grid uses the system to reliably settle and balance 62 the composite grid with the optimal power flow analysis and preferably using blockchain settlements on a transactive energy market that is decentralized and distributed across the nodes on the grid 64. Accordingly, it will be appreciated that the blockchain distribution energy management system is more efficient compared to direct integration for distribution systems and more resilient for both transmission and distribution than previously suggested transactive energy systems.

It will be appreciated that nodes which have the ability to store energy, such as in batteries or other energy storage capacities, can be either a seller or a buyer on the composite grid. Battery banks that are used for homes or vehicles may be powered using renewable energy sources and may serve as sellers or they may be powered from the composite grid in which case they would be a buyer. Although some renewable energy source may not be identified as a participating generator because the energy source is transitory and/or cyclical as explained above rather than being readily generated by some stored power source, such as coal, gas, or some other fuel, when a renewable energy source is paired with a battery bank or some other fixed storage energy source, the combined renewable energy system with storage can be considered a participating generator. It will be appreciated that a stored power source can also use renewable energy, and although it may be inefficient with current technologies, as the operational temperatures of superconductors get closer to ambient temperatures of their surrounding environment, the inefficiencies will be reduced. As one non-limiting example, consider a solar power field that may traditionally store energy in banks of batteries; such a solar power electrical generator may alternatively be connected to pumps that force water through pipes uphill to a water reservoir at a top of a mountain and when electrical power is required and there is not sufficient solar power, the water can be passed downhill through water turbines for the generation of hydroelectric power. Accordingly, fixed storage can be any means by which electrical power may be generated on demand by the generator system based on any type of stored energy at the particular node.

Figure 3A:
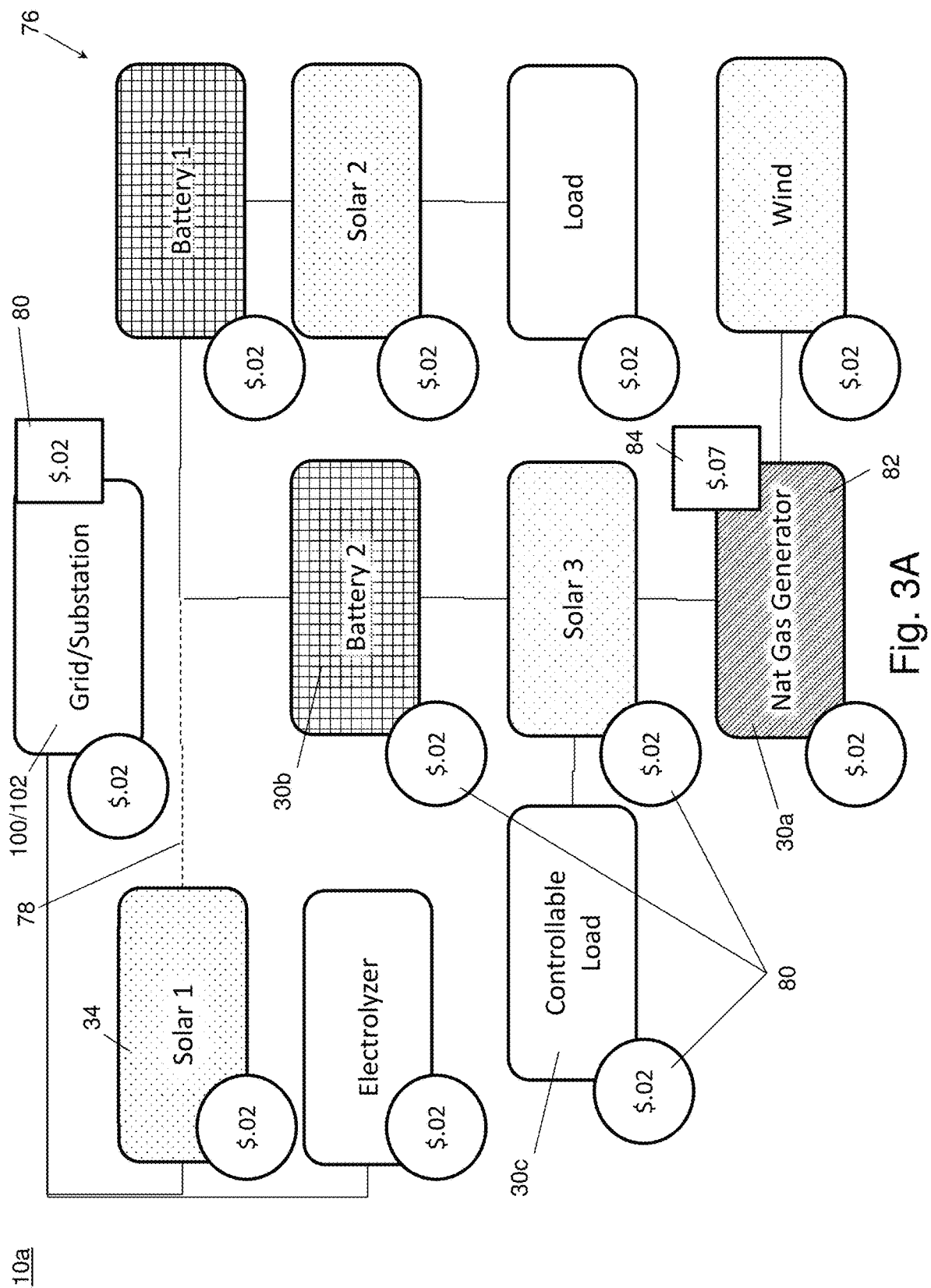
FIGS. 3A and 3B show schematic views of a local implementation of the blockchain distribution energy management system in an initial state and a subsequent controlled state, respectively.
Figure 3B:
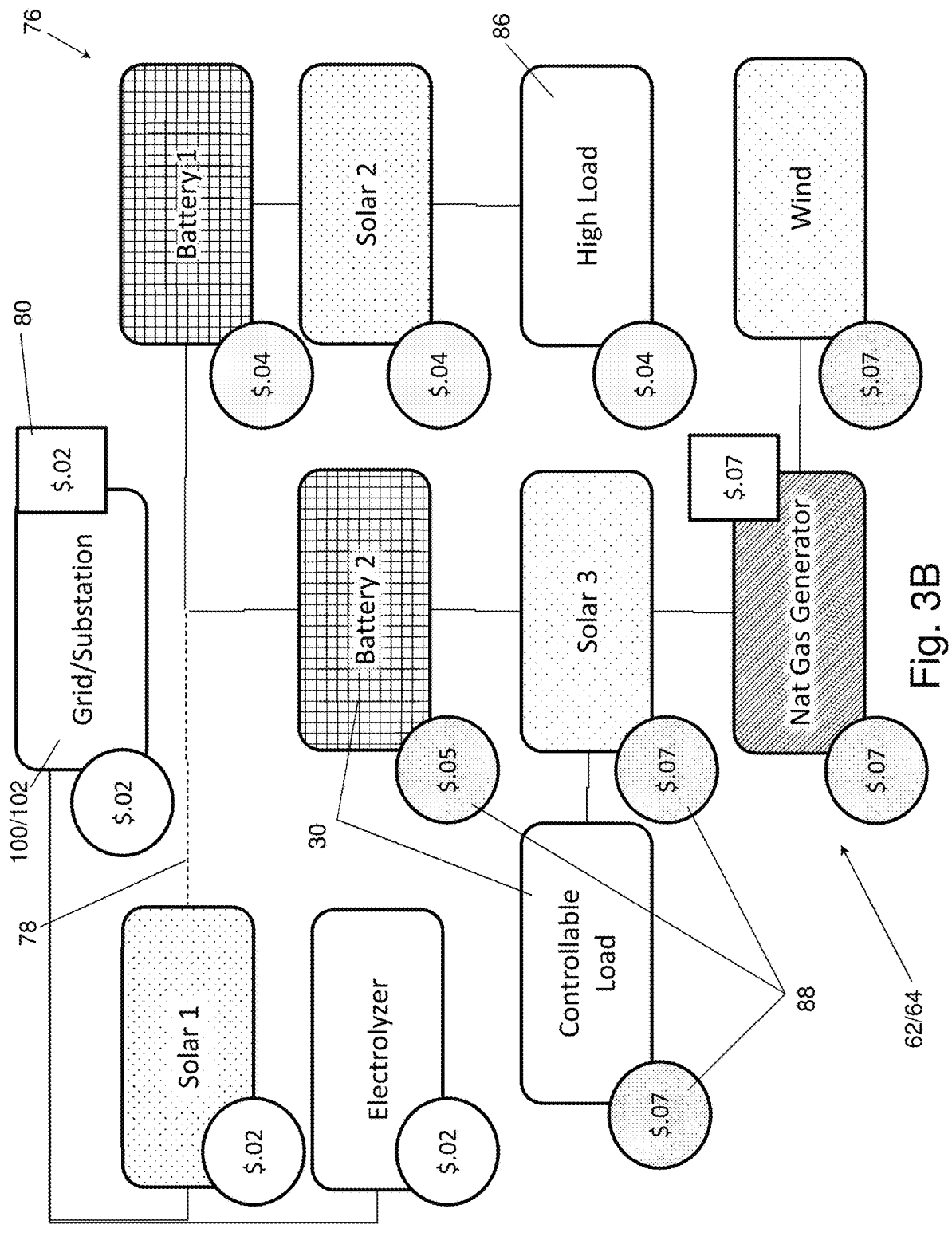

A representative local power market is shown in FIG. 3A having an initial state with unconstrained operation and is shown in FIG. 3B in a subsequent controlled state where a controllable resource supplements power to a portion of the local grid. In this example, there is a constrained section of the local grid 76 because of a limited capacity powerline 78. During the normal unconstrained operation shown in FIG. 3A, the grid price 80 of $0.02/kW defines the cost for all the nodes in the system and the Capstone turbine 82 sits idle because the $0.07 kW bid 84 of this controllable generator is more expensive than the standard grid price, and no loads are willing to pay the higher price. If the state of the system changes such that there is a high demand load 86 downstream of the limited capacity powerline, and the limited capacity powerline would be overloaded if the entire demand is met from the power off of the grid through the substation, the recalculation of the LMP determines that there is a demand differential that cannot be supplied from the substation grid according to the grid constraint, and the Capstone turbine should be brought online. The energy service order activates the Capstone turbine which provides at least some of the additional demand required by the high demand load(s) downstream of the limited capacity powerline.

In the state of operation in which the Capstone turbine is activated and is supplying some of the power to the nodes downstream of the limited capacity powerline, the power provided to these nodes is set at a blended price based on how much energy they can get from each source. Depending on the location and status of solar power and battery power on the local grid, the cost for these power sources could be at the standard grid rate, at the rate of the Capstone turbine, or at some blended rate 88 between the grid rate and the Capstone turbine. It will be appreciated that the Capstone turbine does not necessarily need to supply the entire demand differential because the other controllable generators, such as the available solar power, and the battery power downstream of the limited capacity powerline can also be activated to provide some of the demand. It will also be appreciated that the controllable load might be able to reduce its power requirement while there is a temporary higher demand from the other load(s) downstream of the limited capacity powerline.

The OG system can manage the electrical power market that is available on a composite grid. The OG system software communicates pricing and settlements with participants. Additionally, the OG system provides the utilities that manage the grid infrastructure the information necessary for them to charge fees to the micro-energy producers that use the infrastructure while letting the free market define the prices for the power, but again with the optimal power flow analysis that is necessary to maintain the integrity and safety of the infrastructure elements, particularly including the lines and the substation equipment. Additionally, the OG system can be used to manage the composite grid, coordinating the response to load demands, storage, and distributed generation. The OG system can also be used for smart islanding of power during outages, even before an outage occurs, such as in anticipation of weather events or other natural disasters like hurricanes, wildfires, and blizzards. During islanding events, the financial transactions within the local market are stored securely in the decentralized blockchain architecture (sometimes referred to as "sharding") and re-integrated into the larger transactional network when operations return to normal. The OG system is a more robust system that is less vulnerable to attacks by hackers, terrorists, and other nefarious actors, particularly when using a blockchain architecture for transactions.

With the distributed nature of the blockchain architecture, the islanding can be used to protect local markets during potentially catastrophic events or to give local markets more control over the type of power used within the community. For example, a community may have a local generator that is more environmentally desirable to the community and is willing to accept a blended rate with the generator online. The community may invest in additional renewable energy and battery technologies as the costs continue to decline and could ultimately produce a community power cooperative. Other communities could similarly use the blockchain architecture to create their own power cooperatives that can trade power over the P2P marketplace. In an alternative acute use of islanding, one or more communities may be sectioned off from the grid to protect against a blackout event occurring elsewhere on the grid. One or more communities with their own local power generators could potentially request the islanding in advance of the event to give the utility time to cut the communities from the grid upstream of their respective substations and rebalance the remainder of the power grid with the optimal power flow analysis.

Figure 4:
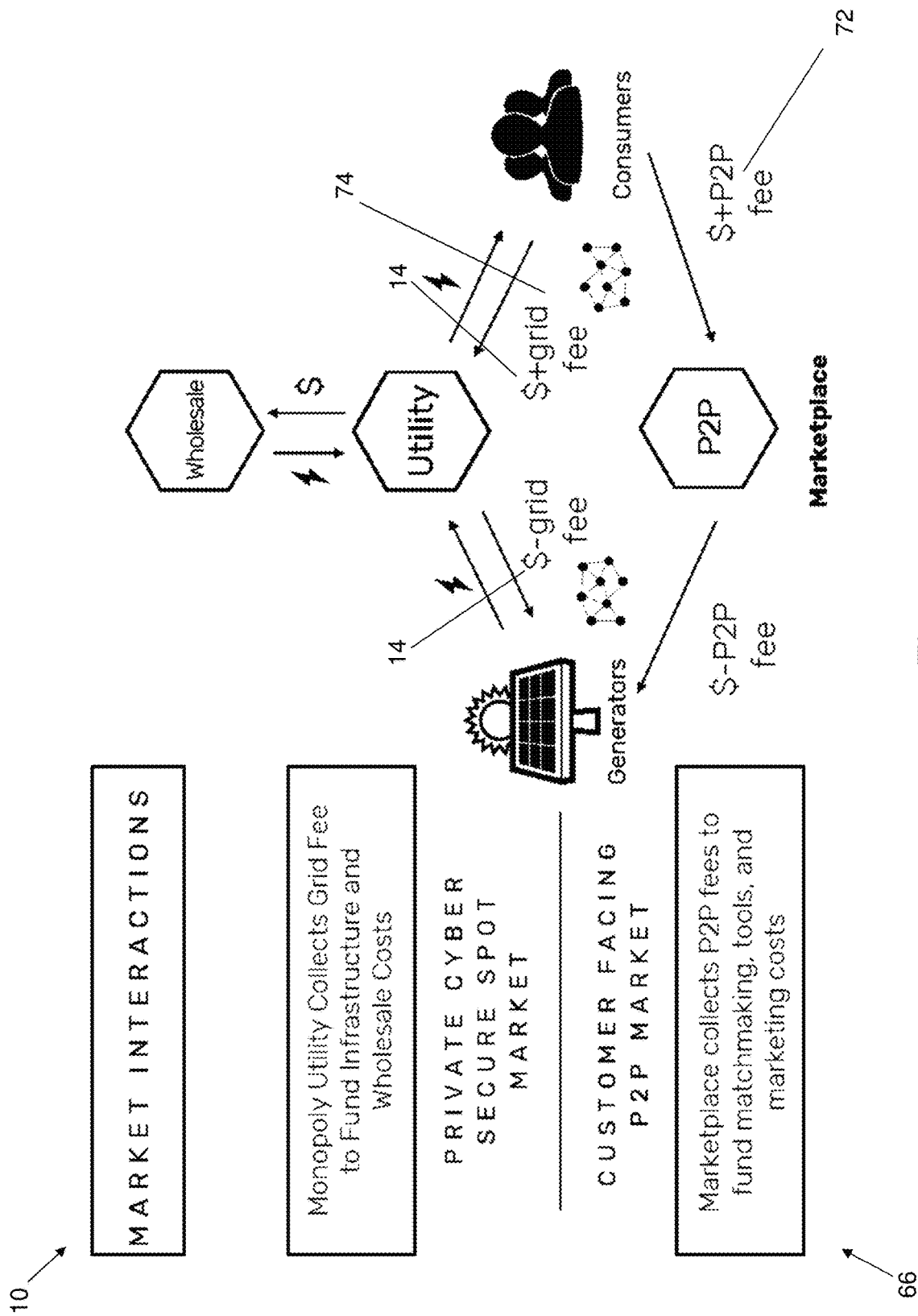
FIG. 4 shows a schematic representation of a cyber-secure spot market implemented with the blockchain distribution energy management system and an optional peer-to-peer local market also using the blockchain distribution energy management system.

As indicated above and schematically shown in FIG. 4, the cyber-secure local market software of the blockchain distribution energy management system can be used as a financial basis for a customer facing peer-to-peer (P2P) marketplace 66. When the attributes of the present invention are considered relative to the previously known systems, it is evident that the incorporation of the optimal power flow analysis into the OG's P2P energy management system results in a more robust solution that can be deployed within existing grids without risking overload situations. In the local market, the utility can collect a grid fee and/or transaction fees 72 which can be used to fund the maintenance and security of the grid infrastructure. With the addition of the P2P marketplace, the utility may obtain transaction fees 74 that can be used to maintain the software and also fund other software development, such as matchmaking tools, and other operations such as marketing costs to grow the customers within the community or grow the system with other communities.

There are numerous other examples on how the present invention can be used to incorporate controllable local power resources into the grid power system. The cyber-secure local markets of the present inventive system performs an optimal power flow analysis and uses LMP in determining the controllable power resource to activate and the level of its operational state for controlling the local power, i.e., a distribution side LMP analysis. Consumers with electric vehicles can benefit by charging when the sun is powering solar panels. Consumers with buildings can also benefit by reducing consumption as the sun sets or wind slows, and solar panels or wind turbines are providing less electricity to the grid. A constrained grid can be managed to incentivize local generation and load reduction during the times the grid cannot deliver enough energy to the loads effected by the constraint. In current systems that do not use the present invention, these constraints would be resolved with an infrastructure investment. However, with the present invention and inexpensive solar, batteries and electric vehicles, there is an opportunity to avoid infrastructure investments by incentivizing local generation and load reduction. The present invention also be used to manage undersupply situations, incentivizing controllable generators or power storage to discharge and/or incentivizing businesses to reduce their controllable load during the times when there is an undersupply of generation available and/or the generation is expensive.

According to the description of the invention above and several examples, it will be appreciated that the cyber-secure local markets of the present inventive system provide several benefits over current systems: the decentralized and distributed system allows for operation without a central control room; the decentralized and distributed system allows for islanding during cyber event or natural disturbances; the decentralized and distributed avoids a single critical point of failure; the decentralized and distributed system allows for immediate transparent regulator access to the system information and financial information; the cyber-secure local market software allows for conducting both balancing and settlement in a single operation; and the cyber-secure local market software removes market index costs and payment transaction costs. Additionally, as explained above with reference to FIG. 1, the blockchain architecture of the system according to the present invention is scalable. Accordingly, the present invention is an improvement over currently known transactive energy models that do not use a blockchain architecture and do not have controllable power resources that can be activated and controlled using blockchain datasets.

As indicated above, the initial setup preferably requires the controllable power resource nodes in a community to be registered with the utility. After the nodes are set up, they are a part of the blockchain architecture and are ready to conduct fast, decentralized and secure transactions. In one embodiment, the smart meters for the respective controllable resources are registered, and each of these smart meters preferably has the computer for the respective node that can run the cyber-secure local market software in a distributed manner. The smart meters provide financial information for their respective nodes and receive the financial information from the other nodes, preferably using blockchain datasets, and the smart meters can also have a peer-to-peer application create the basis for any P2P agreements.

Before a node can join the computer communications network, it must have a node id. The node id must be accompanied by a digital certificate issued by the central authority. The certificate is used to sign the node id and the list of grid components controlled by this node id (for example node_id peer-324 can control load-tesla-charter-101 and generator-solar-panel-132). This mechanism assures authentication of the nodes and the components that they control. When a new node joins the computer communications network, it generates private/public RSA keys and sends to other peers its own node id, its certificate issued by the central authority, its public RSA key, and its network address (ip:port). If the certificate is valid, the other nodes accept the new node as one of them. All nodes share information about the nodes they know (they ping each other randomly and periodically) so that every node acquires full knowledge of the logical network and until each node knows the node id, the public key, and the network address of every other node.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, it will be evident that the present invention could also be used in energy production and consumption systems that are behind the meter and are not necessarily shared with the nodes on the macro grid, such as micro-grid government and private uses, corporate or college campuses, or large buildings. Thus, the breadth and scope of the present invention should not be limited by any of the above-described exemplary embodiments, but should be defined only in accordance with the following claims appended hereto and their equivalents.

What is claimed is:

1. A method for operating a cyber-secure local electrical power market for a power grid with a utility operator transmitting electrical power to multiple communities having respective substations, a plurality of customers in a distribution network served by a substation facility on the power grid, and a group of participating nodes within the distribution network, comprising the steps of:

providing a blockchain architecture to a plurality of computers corresponding with the group of participating nodes within the distribution network, wherein the computers are in operative communication with each other through a communications network; wherein each of the participating nodes is comprised of a controllable resource, wherein the controllable resource in at least one of the group of participating nodes is a controllable load, wherein the controllable resource in at least another of the group of participating nodes is at least one of a controllable generator and a controllable battery pack, and wherein each of the computers respectively corresponds to the controllable resource at each of the group of participating nodes;

distributing to the computers through the blockchain architecture on the communications network a set of financial information for each of the group of participating nodes in the distribution network;

operating a decentralized market software platform on a host computer system for the utility operator, wherein the host computer system is in operative communication with the computers through the blockchain architecture over the communications network and receives the set of financial information for each of the group of participating nodes in the distribution network;

calculating with a set of the computers in operative communication with each other within the blockchain architecture a Locational Marginal Pricing across the group of participating nodes in the distribution network according to the set of financial information;

determining with the set of the computers a set of energy service orders corresponding to the Locational Marginal Pricing and an availability of local energy resources according to each controllable resource in the group of participating nodes in the distribution network; and sending the set of energy service orders over the communications network to a corresponding set of the computers, wherein the corresponding set of computers are associated with each controllable resource for the corresponding local energy resources;

wherein the set of financial information for the controllable generator and the controllable battery pack are comprised of a set of local prices for a local generation of local electrical power within the distribution network, wherein the set of financial information for the utility operator is comprised of a standard grid price for the electrical power available to multiple communities, wherein the energy service orders can be a power supply order for the controllable generator and for the controllable battery pack in a discharging mode of operation and can be a power constraint order for the controllable load and for the controllable battery pack in a charging mode of operation, wherein the energy service orders activates at least one of the controllable resource in the group of participating nodes in the distribution network to change states from an initial state of operation to a new state of operation, wherein the calculating step for the Locational Marginal Pricing calculated within the blockchain architecture is repeated following a changed state of operation in the distribution network, wherein the electrical power at one or more of the group of participating nodes in the distribution network is at least one of an oversupply condition and an undersupply condition according to the changed state of operation, wherein the Locational Marginal Pricing calculated within the blockchain architecture lowers the standard grid price for the electrical power in the case of the oversupply condition to encourage energy service orders that increase electrical power consumption by the group of participating nodes and to discourage energy service orders that would result in excess local generation of local electrical power, and wherein the Locational Marginal Pricing increases the prices of local electrical power in the distribution network in the case of the undersupply condition to encourage energy service orders that increase the local generation of local electrical power and reduce electrical power consumption by a controllable load set of the group of participating nodes in the distribution network.

2. The method of claim 1, wherein each of the group of participating nodes is further comprised of a smart meter, wherein each of the controllable resource is further comprised of a controller responsive to energy service orders, wherein the computers are incorporated into the respective smart meter for each of the group of participating nodes, wherein the host computer system creates an initial state of the controllable resource with an initial blockchain dataset and provides access to the other computers in operative communication within the blockchain architecture, wherein the group of participating nodes associated with each of the other computers is serviced by the same substation in the distribution network, wherein the set of energy service orders activates a corresponding set of the controllers for controllable resources to change a respective controllable resource from the initial state to a new controlled state, and wherein the blockchain architecture is updated with a new blockchain dataset corresponding with the new controlled state.

3. The method of claim 2, wherein the host computer system creates the initial state of the group of participating nodes within the blockchain architecture using at least one of transmission market data and forecasted forward market data without any optimal power flow analysis being performed, and wherein the decentralized market software platform on the host computer system provides access to a different group of participating nodes having a different substation and a different initial state in the distribution network and a different blockchain dataset with same blockchain architecture corresponding to the different initial state.

4. The method of claim 1, wherein the set of financial information within the blockchain architecture is comprised of a set of power bids, the energy service orders, and a set of deliveries, wherein the set of computers communicating through the blockchain architecture calculate an energy balance with a transmission system in determining the energy service orders, and wherein the step for calculating the Locational Marginal Pricing is performed by solving a Security Constrained Economic Dispatch optimization problem for the local distribution of the electrical power on the power grid according to the set of financial information and grid constraints.

5. The method of claim 4, further comprising the step of incorporating peer-to-peer energy trade financial information within the blockchain architecture.

6. The method of claim 1, further comprising the steps of:
loading the most recent topology of the electrical grid into a database in the host computer system;
sharing the topology in a blockchain dataset within the blockchain architecture; and conducting an optimal power flow analysis with the set of computers in operative communication within the blockchain architecture.

7. The method of claim 6, further comprising the steps of:
confirming with each of the group of participating nodes using the blockchain dataset a set of deliveries of a respective energy service orders by the controllable resource;
initiating within the blockchain architecture a settlement process with each one of the group of participating nodes based on the set of deliveries to the power grid.

8. A method for operating a decentralized market software platform for electrical power on a power grid with a network of computers in operative communication with distributed electrical power meters and in networked communication with a host computer system provided by a utility operator of the power grid, comprising the steps of:
loading the most recent topology of the electrical grid into a database in the host computer system;
polling each one of the network of computers communicating with the corresponding electrical power meters for a real-time electrical power load status with a processor in the host computer system;
polling with the processor a plurality of participating controllable resources for a corresponding set of operating electrical power loads;
determining with the processor a set of the participating controllable resources that can change their respective states of operation according to a set of power bids corresponding with financial information for the participating controllable resources;
conducting with the processor an optimal power flow analysis to determine a set of energy service orders to be placed with the participating controllable resources;
communicating the energy service orders to the participating controllable resources from a communications module in the host computer system in operative communication with the processor through the networked communication;
calculating with the processor a Locational Marginal Pricing for the energy service orders;
confirming with the participating controllable resources a set of implementations of the respective energy service orders on the power grid; and
initiating in the processor a settlement process with each one of the participating controllable resources based on the set of implementations on the power grid;
wherein the step of determining the set of the participating controllable resources that can change their respective states of operation according to the set of power bids is further comprised of the steps of:
determining a first set of the participating controllable resources that can serve as controllable generators based on their operating electrical power loads according to a set of power generation bids in the set of power bids, wherein the controllable generators are within a distribution network serviced by the substation facility providing the electrical power from the utility operator on the power grid, wherein the controllable generators provide a local generation of local electrical power at least within the distribution network, and wherein the financial information for the controllable generators is comprised of a set of local prices for the local generation of local electrical power within the distribution network; and
determining a second set of the participating controllable resources that can serve as controllable loads based on the electrical power meters and the corresponding computers according to a set of power load bids in the set of power bids, wherein the controllable loads are within the distribution network serviced by the substation facility; and
wherein the power generation bids define a set of ranges in which the controllable generators are offering to operate, wherein the power load bids define a set of variable load demands consumers are offering to operate with the controllable loads, wherein the step of calculating the Locational Marginal Pricing is repeated following a changed state of operation in the distribution network, wherein the electrical power at one or more of the participating controllable resources in the distribution network is at least one of an oversupply condition and an undersupply condition according to the changed state of operation, wherein the Locational Marginal Pricing lowers a standard price for the electrical power supplied by the utility operator within the distribution network in the case of the oversupply condition to encourage energy service orders that increase electrical power consumption and to discourage energy service orders that would result in excess electrical power generation, and wherein the Locational Marginal Pricing increases the local prices within the distribution network in the case of the undersupply condition to encourage energy service orders that increase electrical power generation by the controllable generators in the distribution network and reduce electrical power consumption by the controllable loads in the distribution network.

9. The method of claim 8, wherein the set of energy service orders communicated to the participating controllable resources activates a corresponding set of the controllers for the participating controllable resources to change a respective controllable resource from an initial state to a new controlled state.

10. The method of claim 8, wherein the most recent topology of the electrical grid and the set of power bids are shared in a blockchain dataset by a set of computers corresponding with the participating controllable resources.

11. The method of claim 10, wherein the step of determining the set of the participating controllable resources that can change their respective states of operation is performed with the set of computer processors communicating with each other within a blockchain architecture, wherein the set of computers communicating through the blockchain architecture calculate an energy balance with a transmission system in determining the energy service orders, and wherein the step for calculating the Locational Marginal Pricing is performed by solving a Security Constrained Economic Dispatch optimization problem for the local distribution of the electrical power on the power grid according to the financial information and grid constraints.

12. The method of claim 11, wherein the step of calculating the Locational Marginal Pricing for the energy service orders is performed by the set of computer processors using the blockchain dataset within the blockchain architecture, wherein the step of confirming the set of implementations of the respective energy service orders with the participating controllable resources is performed by the set of computer processors using the blockchain dataset within the blockchain architecture, and wherein the step of initiating the settlement process with each one of the participating controllable resources is performed by the set of computer processors using the blockchain dataset within the blockchain architecture.

13. A method for operating a decentralized market software platform for electrical power on a power grid with a network of computers in operative communication with each other in a blockchain architecture and with distributed electrical power meters and in networked communication with a host computer system provided by a utility operator of the power grid within the blockchain architecture, comprising the steps of:

loading the most recent topology of the electrical rid into a database in the host computer system;

polling with a processor in the host computer system and a set of the computers in the network of computers in the blockchain architecture each one of the computers communicating with a corresponding electrical power meters for a real-time electrical power load status;

polling with the processor and the set of computers in the blockchain architecture a plurality of participating controllable resources and a corresponding set of operating electrical power loads;

determining with the processor and the set of computers in the blockchain architecture a set of the participating controllable resources that can change their respective states of operation according to a set of power bids corresponding with financial information for the participating controllable resources;

communicating the energy service orders from the processor and the set of computers to the participating controllable resources with a blockchain dataset in the blockchain architecture through the networked communication;

calculating with at least the processor a Locational Marginal Pricing for the energy service orders;

activating a corresponding set of the controllers for the participating controllable resources to change a respective controllable resource from an initial state to a new controlled state;

confirming with the participating controllable resources a set of implementations of the respective energy service orders on the power grid using the blockchain dataset in the blockchain architecture; and initiating in the processor a settlement process with each one of the participating controllable resources based on the set of implementations on the power grid using the blockchain dataset in the blockchain architecture;

wherein the step of determining the set of the participating controllable resources that can change their respective states of operation according to the set of power bids is further comprised of the steps of:

determining a first set of the participating controllable resources that can serve as controllable generators based on their operating electrical power loads according to a set of power generation bids in the set of power bids, wherein the controllable generators are within a distribution network serviced by a substation facility providing the electrical power from the utility operator on the power grid, wherein the controllable generators provide a local generation of local electrical power at least within the distribution network, and wherein the financial information for the controllable generators is comprised of a set of local prices for the local generation of local electrical power within the distribution network; and determining a second set of the participating controllable resources that can serve as controllable loads based on the electrical power meters and the corresponding computers according to a set of power load bids in the set of power bids, wherein the controllable loads are within the distribution network serviced by the substation facility; and wherein the set of power generation bids define a set of ranges in which the controllable generators are offering to operate, wherein the power load bids define a set of variable load demands consumers are offering to operate with the controllable loads, wherein the step of calculating the Locational Marginal Pricing is repeated following a changed state of operation in the distribution network, wherein the electrical power at one or more of the participating controllable resources in the distribution network is at least one of an oversupply condition and an undersupply condition according to the changed state of operation, wherein the Locational Marginal Pricing lowers a standard price for the electrical power supplied by the utility operator within the distribution network in the case of the oversupply condition to encourage energy service orders that increase electrical power consumption and to discourage energy service orders that would result in excess electrical power generation, and wherein the Locational Marginal Pricing increases local prices within the distribution network in the case of the undersupply condition to encourage energy service orders that increase electrical power generation by the controllable generators in the distribution network and reduce electrical power consumption by the controllable loads in the distribution network.

14. The method of claim 13, wherein the step of determining the set of the participating controllable resources that can change their respective states of operation according to the set of power bids is further comprised of the steps of:

determining the first set of the participating controllable resources that can serve as controllable generators based on their operating electrical power loads according to the set of power generation bids in the set of power bids, wherein the controllable generators are within the distribution network serviced by the substation facility providing the electrical power from the utility operator on the power grid, wherein the controllable generators provide the local generation of local electrical power at least within the distribution network, and wherein the financial information for the controllable generators is comprised of the set of local prices for the local generation of local electrical power within the distribution network; and determining the second set of the participating controllable resources that can serve as controllable loads based on the electrical power meters and the network of computers according to the set of power load bids in the set of power bids, wherein the controllable loads are within the distribution network serviced by the substation facility.

15. The method of claim 14, wherein the set of power generation bids define the set of ranges in which the participating generators are offering to operate, and wherein the power load bids define the set of variable load demands consumers are offering to operate with the participating controllable loads.

16. The method of claim 13, wherein the step of calculating the Locational Marginal Pricing is performed in a distributed processing manner by the processor and the set of computers in the blockchain architecture.

17. The method of claim 13, further comprising the step of conducting with at least the processor an optimal power flow analysis to determine a set of energy service orders to be placed with the participating controllable resources.

\* \* \* \* \*